INVENTORS
KARL WINTER
ELMAR ARENSMEIER

INVENTORS
KARL WINTER
ELMAR ARENSMEYER

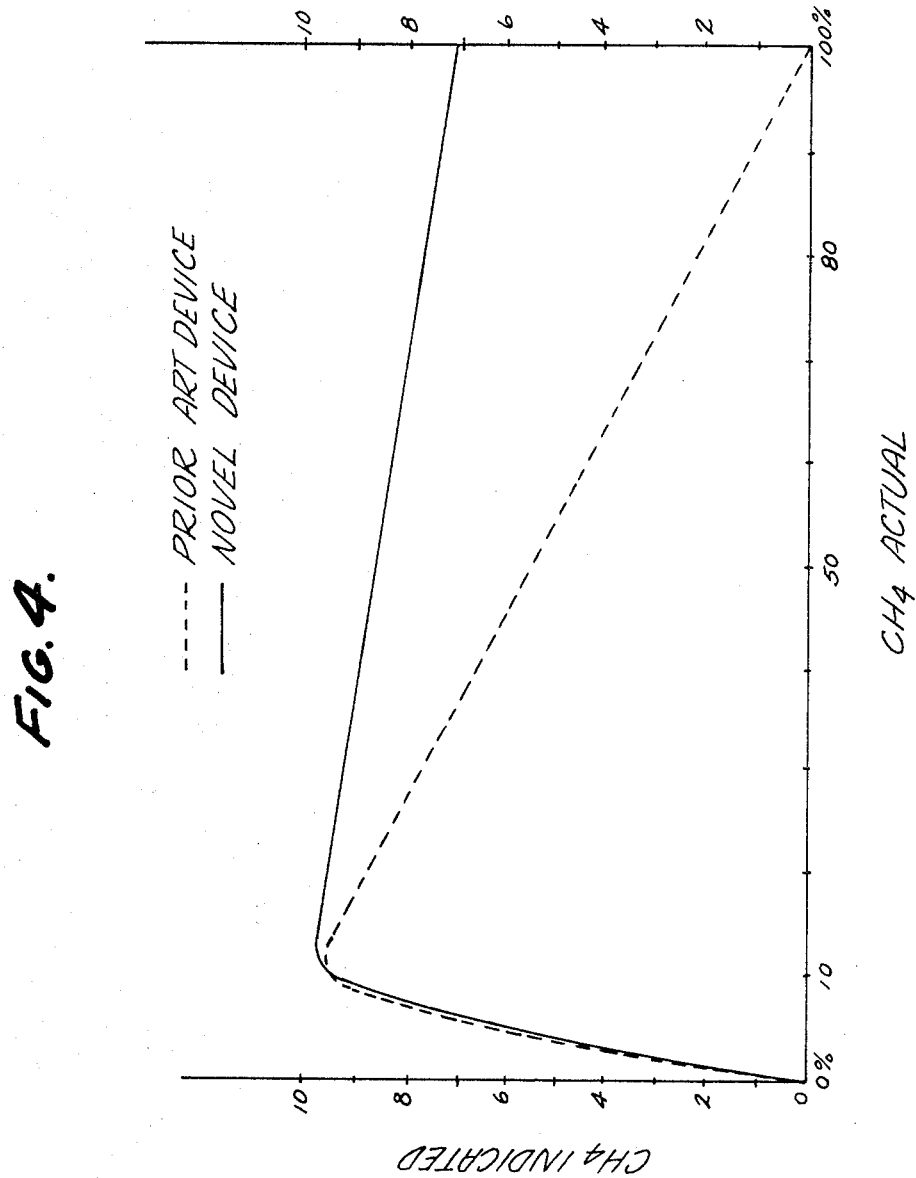

3,519,391
Patented July 7, 1970

3,519,391
METHOD OF AND APPARATUS FOR MEASURING COMBUSTIBLE CONSTITUENTS OF GAS SAMPLES
Karl Winter, Bochum-Weitmar, Germany (1 Am Holzwege, Bochum-Linden, Germany), and Elmar Arensmeyer, 3 Am Rechteck, Bochum-Weitmar, Germany
Continuation-in-part of application Ser. No. 321,739, Nov. 6, 1963. This application Sept. 22, 1967, Ser. No. 669,927
Int. Cl. G01n *25/32;* G08b *21/00*
U.S. Cl. 23—232                                    5 Claims

ABSTRACT OF THE DISCLOSURE

Method and apparatus for measuring combustible gas content, employing an electrical bridge circuit having a catalytic filament (resistor) for measuring heat or combustion and a thermal conductivity compensating filament (resistor) in two legs of one branch of the circuit, and having a thermal conductivity measuring filament (resistor) in the second branch of the circuit, preferably with a resistor used to compensate for resistance changes due to heating up of the apparatus during use.

CROSS REFERENCE TO RELATED APPLICATION

This application is a continuation-in-part application of our copending application Ser. No. 321,739, filed Nov. 6, 1963, and now abandoned and entitled A Method of and Apparatus for Measuring Combustible Constituents of Gas Samples.

BACKGROUND OF THE INVENTION

The invention relates to a method of measuring combustible constituents in gas samples, particularly in samples of mine gases, and to apparatus for performing the same. The invention particularly relates to a method and apparatus for reliably indicating unsafe high percentages of combustible constituents in gas samples in all ranges of the combustible constituents.

Firedamp testing apparatuses hitherto used in mines for measuring the methane content of the air in a mine are based upon the principle of measuring the heat of reaction, that is to say the quantity of heat released when the methane is burned. The sample of gas is burned in a measuring chamber and the change in resistance of a heated filament which also initiates catalytically the combustion is measured in a Wheatstone bridge. The change in resistance is taken as a measure of the methane content of the tested gas sample. In order to eliminate unwanted effects upon the heating effect due for instance to fluctuations in thermal conductivity of the gas sample, the adjacent arm of the bridge contains a compensating filament which is likewise heated. However, this filament is not exposed to the heat of combustion. This prior art device is explained in more detail hereinafter with reference to FIG. 1.

In prior art apparatus of the afore-described kind, the methane content can be accurately determined up to concentrations of 9.5% $CH_4$ by making use of the combustion equation $CH_4 + 2O_2 = CO_2 + 2H_2O + 193.5$ kcal. However, the results cease to be accurate when the concentration of methane in the tested sample exceeds this amount because at higher concentrations, the oxygen in the sample is no longer sufficient for supporting the combustion of all the methane. Only as much methane will then be burned as corresponds to the proportion of oxygen present and the measurement will therefore indicate the presence of only that part of the methane which has actually been burned. It is therefore possible for a measurement to indicate a methane content which is far lower than that actually present. At methane contents above 9.5% the indication given by such apparatus is roughly proportional to half the proportion of oxygen present. In fact, using the prior art type detecting apparatus, the indicator first climbs from 0 up to about 9.5 as the combustible gas content increases from 0 to 9.5% and then falls from 9.5 back to 0 as the combustible gas content continues to increase from 9.5 to 100%. It is therefore impossible to determine with such apparatus, for instance, whether the methane content is 1 or about 90%, 2 or about 80% and so forth. This is explained in detail hereinafter with reference to FIG. 4. This defect of known apparatus may involve a tremendous danger to the miner using the apparatus because bad air (i.e. air poor in oxygen), such as that occasionally accumulating at more elevated points in a mine (near the roof), may well not be recognized. Moreover, the shotfirer who is not authorized to fire shots under the provisions of Mining Regulations if the methane content exceeds 1% may not be able to differentiate between a methane content in the air under 1% and one actually exceeding 90%. The mine workers are therefore exposed to substantial hazards.

Apparatus is also known which functions by measuring the conduction of heat, that is to say in which the change in resistance of a filament due to the thermal conductivity of the tested gas sample is used as a measure for determining the percentage content of a constituent in the gas sample. However, thermal conductivity measurements presuppose that the gas samples are such that a change in their composition will give rise to practicable changes in resistance, even though these may be small in a filament immersed in the sample, in other words in which changes in composition will be accompanied by a reasonably high change in their thermal conductivity. However, a very real practical difficulty involved with the use of such instruments in mines is that disturbing components such as $CO_2$ and moisture must be removed from the gas samples before they can be tested for their methanes content by this method.

SUMMARY OF THE INVENTION

A primary object of this invention is to provide a method and apparatus which will permit dangerous quantities of methane content of a gas sample to be reliably ascertained, removing the uncertainty of and danger to workmen previously caused by like readings with vastly different gaseous compositions. Further, this is achieved without the necessity of first removing components which would interfere with the measurements. According to the invention this is achieved with a relatively simple bridge circuit that employs the resistance due to a change in thermal conductivity both to compensate for a measurement of the change in resistance due to the heat of combustion, and also to be superimposed thereupon.

The apparatus substantially comprises a bridge circuit with a heat of combustion measuring resistor (filament) and a thermal conductivity compensating resistor (filament) both in one current branch of the bridge, and another thermal conductivity measuring resistor (filament) in the second branch of the bridge, all three being exposed to the gas as by being in gas receiving measuring chamber means. Preferably, the last noted resistor will be located in the same chamber which also contains the first two mentioned resistors. Normally, the bridge circuit contains a fourth resistor which merely compensates for the change in resistance in the circuit as the apparatus heats up during use. This last resistor is in a separate chamber and is in the second branch of the circuit.

These and other objects of this invention will become

BRIEF DESCRIPTION OF THE DRAWINGS

FIG. 4 is a graph showing operational characteristics of both the prior art apparatus and the inventive apparatus.

PRIOR ART DEVICE

Figure 1:
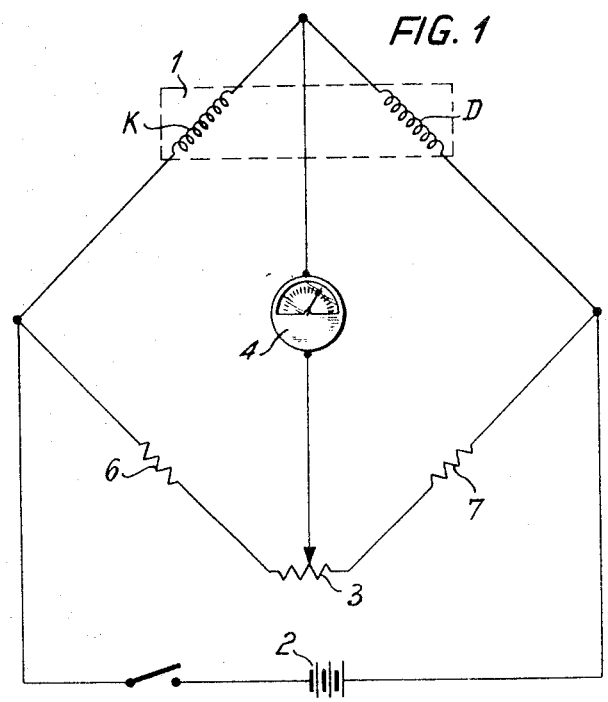
FIG. 1 is a circuit diagram of a conventional prior art apparatus.

In the circuit of a conventional apparatus for measuring the methane content of mine gases, as exemplified in FIG. 1, a resistor filament D (detector filament) which is normally a catalytic element, and a compensating filament K which is not a catalytic element, are obtained in the same chamber 1. The bridge is supplied with current from a source 2 in a manner that is well understood. Before a measurement is performed, current is supplied and the bridge is electrically balanced by adjusting the tap of a potentiometer 3. The supply of current is then cut off and the gas sample is introduced into chamber 1. When this has been done the supply of current is restored so that the resistance filaments in the Wheatstone bridge are heated up. Because of catalytic oxidation of the gas sample, the equilibrium of the bridge is disturbed to cause the instrument pointer to move. The two filaments D and K will so be heated to different temperatures, the temperature of filament D rising to a higher level than that of filament K. The heat of combusion of the methane affects the ohmic resistance of the catalytic filament D causing the needle of a measuring instrument 4 to be deflected by an amount which corresponds to the concentration of methane in the sample (when the concentration is less than about 9.5%). Resistors 6 and 7 are fixed resistors in the two remaining arms of the bridge.

However, the operator really does not know for any particular indicator reading whether a low percentage or a high percentage of dangerous combustible methane gas is actually present. As example, an indicator reading of 2 (vertical scale in FIG. 4) may be either 2% or about 80% methane, i.e. safe or very unsafe; and indicator reading of 4 may be either 4% or 60%, etc. According to usual safety regulations, a man should leave the premises at a methane content of about 5% or above.

DESCRIPTION OF THE PREFERRED EMBODIMENT OF THE INVENTION

Figure 2:
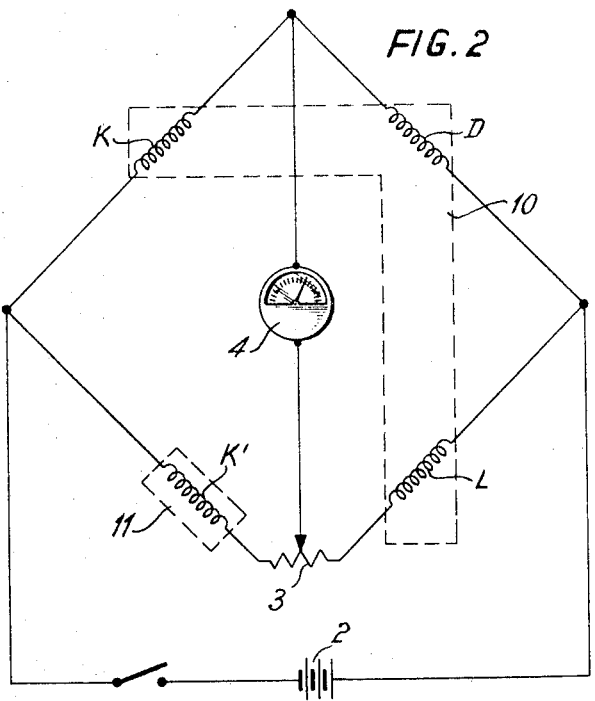
FIG. 2 is a circuit diagram of the novel apparatus for performinng the method according to the invention.

In apparatus according to the invention, such as that shown in FIG. 2, chamber 10 which is exposed to the gas as by receiving a sample of the gas to be tested, contains three filaments, i.e. resistors, D, K, and L.

Specifically, filaments D and K are in one current conducting branch of the bridge circuit, and filament L is in the second current conducting branch. Flament D is intended to measure the heat of combustion of the gas (but also is responsive to the thermal conductivity of the gas), and is normally of the conventional catalytic type for causing combustion of the gas. Filment K, in the second leg of this first branch, is responsive to the thermal conductivity of the gas and acts as a compensating element for the thermal conductivity response of element D to negative this factor so that this first circuit branch will only activate indicator 4 in response to the heat of combustion measurement. Filament L in the second branch, is responsive to thermal conductivity, and causes its effect to be superimposed on the reading from the first branch to cause indicator 4 to show the added result of both branches. Resistor K' which is normally in a second chamber, i.e. is not exposed to the gas sample, is in the second leg of the second bridge circuit branch to stabilize the circuit against change in circuit resistance with heating up to the apparatus during use. Sealed chamber 11 containing stabilizing or compensating resistor K' for the conductivity measurement may be a separate sealed chamber 11 which, according to the nature of the proposed measurement, may be filled with air or some other gas. The resistor L for measuring thermal conductivity and the associated compensating resistor K' are heated to a lower temperature level than the resistor D for measuring the heat of reaction, so that resistors L and K' will be affected by thermal conductivity but not by the heat of reaction. By suitably selecting the values of resistors D and K as well as of L and K' and their disposition the effects of the heat of reaction and of thermal conductivity may be arranged to be either additive or differential. For instance, the conductivity measuring resistor L intended, for instance, for firedamp measuring apparatus, may be so contrived that in the normal measuring range between 0 and 2% or 0 to 5% methane thermal conductivity will have an effect on resistor L which can be wholly neglected, whereas at higher methane concentrations up to 100% the reduction in oxygen content will reduce the effect due to heat of reaction, whereas at the same time the effect of thermal conductivity will be so high that up to concentrations of 100% methane the measuring instrument 4 will be fully deflected and this deflection will be miantained even if the measuring circuit remains energized for a prolonged period of time.

Figure 3:
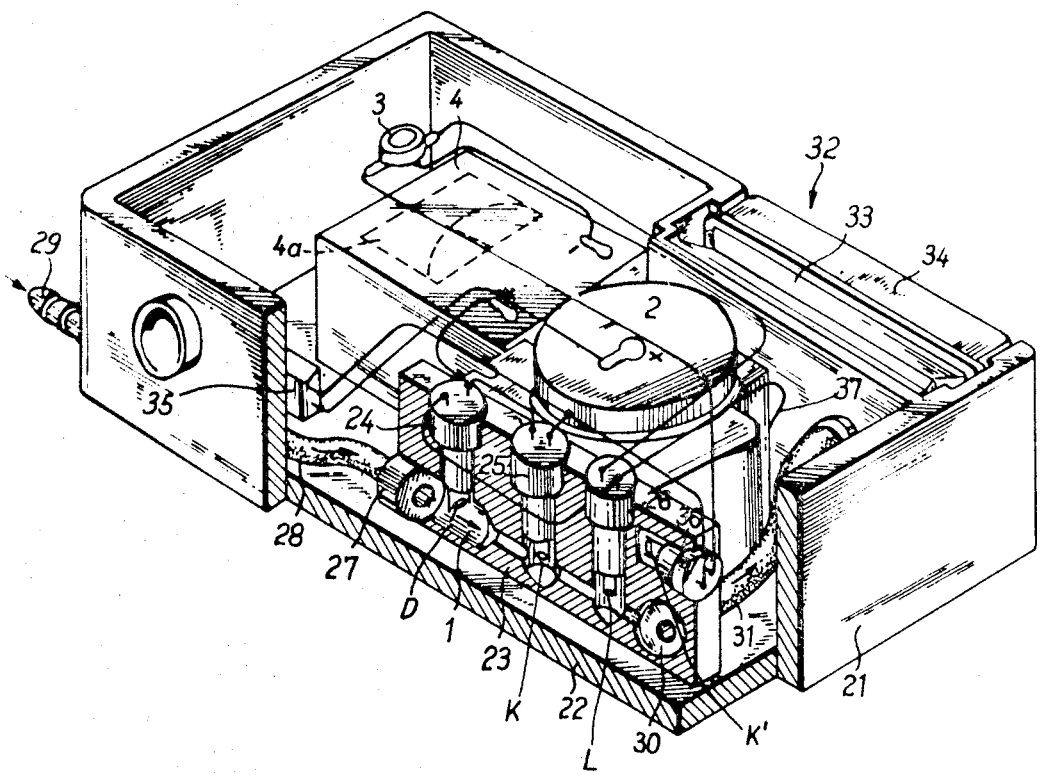
FIG. 3 is a partly sectioned perspective view of a measuring apparatus in accordance with the invention.

As shown by the solid line in FIG. 4, even when the methane content increases above 9.5%, the indicated value remains above 7 which is above the danger level figure of a maximum of about 5. Hence the indicator can be provided with a reliable danger signal above about 5 or so. If the indicator is below the danger signal, the operator can be positively assured that the reading accurately reflects the gas content. FIG. 3 shows a sectional view of apparatus according to the invention. Parts which are shown in FIG. 2 are given the same reference numerals in FIG. 3.

The measuring instrument 4 is installed in a housing 21 having a front plate 22, the scale 4a of the instrument 4 lying in the plane of the front plate and therefore being shown dotted in the drawing.

A member 23, which receives the individual filaments in its interior, is mounted on the front plate 22. This member 23 has a bore for the reception of a carrier 24 for the catalytic filament D. A second bore serves for the reception of a carrier 25 for the compensating filament K. A third bore receives a carrier 26 for the filament L for measuring thermal conductivity. A fourth bore receives a carrier 36 for the filament K'. Opening at 27 is a pipe 28 which is connected with a gas inlet pipe 29. A connection is provided at 30 to which is secured a flexible tube 31 which leads to a manually operated suction pump 32. This suction pump consists of a small bellows 33 and a handle 34 in which a gas outlet non-return valve (not shown) is provided. When the suction pump 32 is operated, air is sucked out from the measuring chamber 1 so that the gas sample can flow through the inlet pipe 29.

The battery required for operating the device is arranged at 2. 3 is the zero potentiometer for initial adjustment, and a switch 35 is connected in series with the battery 2.

The individual filaments D, K, L and K' are received on small beads of an electrically insulating material, mounted on the carriers 24, 25, 26, 36 and which receive corresponding small filaments of a suitable metal or a suitable metal alloy in their interior.

The positive pole of the battery 2 may be seen in the drawing, the negative pole lying on the invisible side of the battery 2 which the wire 37 leads.

With about five pump strokes of the pump 32, the air sample to be tested is brought into the measuring chamber 1. The apparatus is then brought into use position and combustion of methane in the measuring chamber 1 is initiated by closing switch 35. Balance of the bridge is upset by increase in resistance in the detector filament D. The pointer of the measuring instrument 4 moves upwards on the scale to a maximum value and falls again after a short delay. The maximum value of the indicator deflection shows the methane content of the air sample on the scale 4a, which is calibrated in percentage of methane.

Using the novel system and method, an operator can readily determine if a dangerously high percentage of methane is present, or conversely can be assured when a safe low percentage is present. This is so since the indicator shows a value in the range of 0–7 only if the methane content is this low. If the indicator shows a value above 7 or 8, the operator knows for certain the methane is above the danger level and the operator must vacate the premises. The device is therefore a valuable aid of great improvement over the prior art.

We claim:

1. A combustible gas content positive indicating apparatus having a bridge circuit with first and second current conducting branches each composed of first and second legs, and indicator means connected across said branches between the respective first and second legs, comprising: first resistor filament means in said first branch responsive to heat of combustion of and to thermal conductivity of the tested gas; second compensating resistor filament means in said first branch responsive only to thermal conductivity of the tested gas to compensate for the thermal conductivity response of said first filament means and thereby cause only the heat of combustion response output to be applied to said indicator means; and third resistor filament means in said second branch, responsive only to thermal conductivity of the tested gas, to apply to said indicator means an output added to said heat of combustion output of said first resistor filament means.

2. The apparatus in claim 1 characterized by including common gas receiving chamber means containing all three of said resistor filaments.

3. The apparatus in claim 1 characterized by said first and second resistor filaments being in said first and second legs of said first circuit branch.

4. The apparatus in claim 1 characterized by said third resistor filament being in the first leg of said second branch, and including a fourth resistor filament in the second leg of said second branch to stabilize against circuit resistance change with heating up of said apparatus during use.

5. A method of reliably indicating safe and unsafe contents of combustible gas in a gas sample, comprising the steps of combusting the gas at a first heated resistor filament and causing an electrical output from said filament reflecting both heat of combustion and thermal conductivity; exposing said gas to a second filament heated just sufficiently to be responsive to gas thermal conductivity, and causing an electrical output therefrom reflecting thermal conductivity; cancelling the thermal conductivity output effect from said first filament with the thermal conductivity output effect from said second filament; exposing said gas to a third filament heated just sufficiently to be responsive to gas thermal conductivity and causing an electrical output therefrom reflecting thermal conductivity; and superimposing the heat of combustion output effect of said first filament with the thermal conductivity output effect of said third filament.

References Cited

UNITED STATES PATENTS

| 2,154,862 | 4/1939 | Olshevsky | 73—27 |
| 2,255,551 | 9/1941 | Willenborg | 73—27 |
| 2,883,270 | 4/1959 | Johnson. | |
| 3,061,826 | 10/1962 | Willenborg | 73—27 XR |
| 3,117,843 | 1/1964 | Baker. | |

MORRIS O. WOLK, Primary Examiner

R. M. REESE, Assistant Examiner

U.S. Cl. X.R.

23—254; 73—27; 340—237